| United States Patent [19] | [11] Patent Number: 4,793,741 |
|---|---|
| Lahalih et al. | [45] Date of Patent: Dec. 27, 1988 |

[54] METHOD FOR IMPROVING THE MECHANICAL PROPERTIES OF SOIL, A POLYMERIC SOLUTION THEREFORE, AND A PROCESS FOR PREPARING POLYMERIC SOLUTIONS

[75] Inventors: Shawqui Lahalih, Rique; Ma'mun Absi-Halabi, Salmia; Nouria Al-Awadhi, Al-Dahia; Khamis Shuhaibar, Al-Shaab, all of Kuwait

[73] Assignee: Kuwait Institute for Scientific Research, Kuwait

[21] Appl. No.: 938,421

[22] Filed: Dec. 5, 1986

[51] Int. Cl.$^4$ .............................................. C09K 17/00
[52] U.S. Cl. ..................................... 405/263; 405/270
[58] Field of Search ................ 405/263, 270; 106/900; 525/58; 427/136; 428/406, 908.8

[56] References Cited

U.S. PATENT DOCUMENTS

| 3,195,273 | 7/1965 | Scott et al. | 405/263 |
| 3,495,412 | 2/1970 | Sakata et al. | 405/264 |
| 3,864,137 | 2/1975 | Van Bonin et al. | 106/75 |
| 3,985,696 | 10/1976 | Aignesberger et al. | 524/6 |
| 4,230,606 | 10/1980 | Amann et al. | 525/58 |
| 4,424,302 | 1/1984 | Block et al. | 525/58 |
| 4,430,469 | 2/1984 | Bürge et al. | 524/428 |
| 4,444,945 | 4/1984 | Sheldrick | 524/843 |
| 4,677,159 | 6/1987 | Lahalih et al. | 524/598 |

Primary Examiner—Dave W. Arola
Assistant Examiner—Anthony Knight
Attorney, Agent, or Firm—Bacon & Thomas

[57] ABSTRACT

The present invention relates to a method for improving the mechanical properties of soil. The method uses an aqueous solution of a sulfonated urea melamine formaldehyde resin and a water soluble polyvinyl alcohol having a molecular weight between 40,000 and 120,000. The aqueous solution is sprayed onto the surface of the soil.

A number of water soluble compositions which include a sulfonated urea melamine formaldehyde resin and polyvinyl alcohol and methods for making the same are also disclosed.

26 Claims, No Drawings

METHOD FOR IMPROVING THE MECHANICAL PROPERTIES OF SOIL, A POLYMERIC SOLUTION THEREFORE, AND A PROCESS FOR PREPARING POLYMERIC SOLUTIONS

BACKGROUND OF THE INVENTION

This invention relates to a method for improving the mechanical properties of soil and its resistance to erosion, a polymeric solution therefore, and to a process for preparing the polymeric solution.

Soil erosion is a phenomenon occurring in a wide variety of situations. For example, it is a serious problem in countries with arid climates and in areas with very little rain fall. Soil erosion problems are frequently caused by the existence of fine particles on the surface of the soil. These fine particles are poorly bonded together and susceptible to erosion by wind and rain.

In addition, the structure of the soil determines its properties such as permeability to water, porosity, crust formation, load carrying capacity, etc. And weak soil and sand structure cause problems in road and highway construction, steep slopes, water channels, construction, excavation banks, landing sites for aircraft and the like.

Extensive research has been carried out in an endeavor to improve soil structure, to reduce soil erosion, to reduce water evaporation and to increase the bonding strength so that it can withstand greater loads. In essence, the research has for the most part had one or two objectives, i.e. to prevent or minimize soil erosion and to improve a soil load carrying capacity.

For example, previous research has disclosed the use of acrylamide polymer cross-linked with N, N-methylene bisacrylamide with other additives such as palm nuts and seaweed as water absorbing material for agricultural applications. Others have used acrylamide polymer as plant growing media.

A number of researchers have used polymer based materials to stabilize the soil. For example, they have used cellulosic polymers with $Al(OH)_3$, latex, lignosulfonates reacted with acrylic acid, polyacrylamide reacted with polyaldehydes and hypohalites, mixtures of dimer diisocyanate and dimer diamine, polyelectrolytes, cationic polymer latexes prepared from acrylates and anionic lignin from cellulosic material, synthetic and rubber latexes with non-ionic surfactants.

In addition, the U.S. Pat. No. 3,495,412 discloses a process for forming a gel-like material in a soil by injecting into the soil an aqueous solution containing three components. The aqueous solution includes urea, formaldehyde and polyvinyl alcohol and is cured within the soil by the addition of an acidic substance. This process is useful for rendering a water-permeable soil water impermeable and thereby stabilizes it.

While most of the aforementioned techniques and compositions have been useful for improving soil structure and/or its resistance to erosion, they also have limitations. For example, toxic monomers such as acrylamide could leak into the water supply and present a health hazard to an operator who is applying it. Other systems are difficult to apply, some are in solid form and some cure slowly, and others are relatively expensive.

SUMMARY OF THE INVENTION

Surprisingly we have discovered that a water soluble material including a sulfonated urea melamine formaldehyde, a water soluble resin such as polyvinyl alcohol and water can be sprayed onto the surface of the soil and will improve the structure of soil and sand. Surprisingly, the treated soil or sand is less susceptible to erosion by wind or water and the improved soil structure will support greater weights.

According to the invention, the process for soil stabilization wherein an aqueous solution is applied to the surface of the soil includes the following steps.

A polymeric solution is made by mixing an aqueous formaldehyde solution having a concentration ranging from about 30-50% at a temperature of between 40°-60° C. and a pH of about 10 to 12 with a urea-melamine resin so that the molar ratio of formaldehyde to urea-melamine is in the range of 2.5 to 4.5:1. The mixing is continued until the urea-melamine resin dissolves.

A sulfonating agent such as an alkali metal sulfite, bisulfite or metabisulfite is added to provide a molar ratio of sulfite group to the urea-melamine in the range of 0.8:1 to 1.2:1 and the resulting solution heated to a temperature of about 70° to 90° C. and maintained at that temperature for a period of 20 to 200 minutes.

The solution from the previous paragraph is then cooled to about 40° to 60° C. and the pH adjusted to about 2.5 to 4.0 by adding an inorganic acid, and the reactants polymerized for a period of 30 to 150 minutes.

The pH of the polymerized solution is adjusted to about 7-9 by adding an alkali metal hydroxide and the solution is heated to a temperature of between 70° to 90° C. Then a polyvinyl alcohol with an average molecular weight in the range of 40,000 to 120,000 is added until the weight ratio of polyvinyl alcohol to sulfite groups is between 0.001 to 0.03:1. And, the solution is maintained at a temperature of 70° to 90° C. for between 30 and 150 minutes.

This resulting solution is cooled and diluted with water until the final solids content is between about 5 to 15%.

And the diluted resin solutions according to the present invention are then applied to the soil surface such as by spraying in an amount of at least 1500 gallons per acre.

In essence, the composition of the resin solution according to the present invention comprises a sulfonated urea-melamine formaldehyde resin, a polyvinyl alcohol and water. And, the relative average molecular weights of the sulfonated urea-melamine formaldehyde resin and the polyvinyl alcohol are from 700,000 to 1,000,000 and from 40,000 to about 120,000 respectively. The ratio by weight of the sulfonated urea-melamine formaldehyde resin to the polyvinyl alcohol ranges between 100:1 to 200:1.

In addition, the molar ratio of formaldehyde to urea-melamine is in the range of 2.5 to 4.5:1 and the molar ratio of the sulfite group to the urea-melamine is in the range of 0.8 to 1.2:1. And, the weight ratio of polyvinyl alcohol to sulfite groups is in the range of 0.001 to 0.03:1.

The compositions and methods disclosed herein have a number of advantages over the prior art. For example, they are water soluble and can be applied with conventional spraying systems. And, the compositions improve the structural strength and at the same time stabilize soil and/or sand against erosion by wind and water. The compositions are particularly effective on sandy soils, i.e. those with a silica content that ranges from 50 to 95%. In addition, the compositions are nontoxic, have an almost immediate effect on the soil and are relatively inexpensive.

DETAILED DESCRIPTION OF THE INVENTION

In accordance with the present invention, a mixture of sulfonated urea-melamine formaldehyde resin, polyvinyl alcohol and water is prepared in the following manner.

An aqueous formaldehyde solution having a concentration ranging between 30–50% and a pH of 10–12 is prepared by dissolving paraformaldehyde (94.6% formaldehyde) in water, adjusting the pH to about 9 by the addition of a basic hydroxide such as sodium hydroxide or other alkali metal hydroxide and heating the mixture at about 40°–60° C. for about 30 minutes. After the complete dissolution of the paraformaldehyde, water is added and the solution heated to maintain the 40°–60° temperature for about 15 minutes. The pH is then raised to about 10–12.

A urea-melamine mixture is added to the aqueous formaldehyde solution until the molar ratio of formaldehyde to urea-melamine is in the range of 3.0 to 4:1. The melamine ssed can be either pure melamine or waste melamine taken from the effluent stream of a melamine manufacturing facility.

Following the dissolution of the urea-melamine mixture, a sulfonating agent such as alkali metal sulfite, bisulfite or metabisulfite is added so that the molar ratio of the sulfite group to the urea-melamine is in the range of 0.9 to 1.1:1. The sulfonating agent is then reacted with the urea-melamine formaldehyde solution at a temperature of 75°–85° C., for a period of 30 to 60 minutes and then cooled to 45°–55° C.

The pH of this solution is then adjusted to 3.0–3.5 by adding an inorganic acid such as sulfuric acid and allowed to polymerize for a period of 60 to 120 minutes.

The pH of the resulting solution is then adjusted to 7–9 and the temperature raised to 75°–85° C. Then polyvinyl alcohol, having an average molecular weight in the range of 70,000 to 100,000 is added so that the weight ratio of polyvinyl alcohol to sulfite groups is in the range of 0.005 to 0.015:1 and the reaction solution heated for 60 to 120 minutes.

According to a preferred embodiment of the invention, the molar ratio of urea to melamine is in the range of 0.1 to 0.6:1 and the relative average molecular weight of the sulfonated urea melamine formaldehyde polymer is in the range of 700,000 and 1,000,000.

It is also contemplated that the melamine used in accordance with this invention can be either pure melamine or waste melamine from effluent streams. Furthermore, in the process of making the compositions according to the present invention, water can be added in varying amounts at various steps in the process so that the concentration of solids of the reaction solution ranges between 10 and 50% preferably between 30–50%. In general, the higher concentrations are more desirable economically.

The solution, prepared as described above, is then diluted to a solid concentration of 8–12% and applied to the soil by spraying or other means such as grouting or mixing with the soil. It should also be noted that the composition described above can be used on various types of soil. However, they have been found to be most effective on sandy soils, i.e. those with between 50 to 95% silica. It has also been found that the compositions are most effective when applied in an amount of about 1500 gallons per acre.

The preferred sulfonated urea melamine formaldehyde polyvinyl alcohol and water solutions include a sulfonated urea-melamine resin with a relative average molecular weight of between 700,000 and 1,000,000 and a polyvinyl alcohol with an average molecular weight of between 70,000 and 100,000.

The following examples illustrate the invention but are not to be construed as limiting its scope.

EXAMPLE 1

A sample of 50.34 g of paraformaldehyde (94.6% formaldehyde) was dissolved in 230 ml of water. The pH of the solution was adjusted to 9 by the addition of NaOH solution and the reaction mixture heated at 50° C. for 30 minutes. Following the complete dissolution of the paraformaldehyde, 88 ml of water was added and heating continued for an additional 15 minutes. The pH was then raised to 11.5 and 50 g of melamine added. After the dissolution of the melamine, 37.7 g of sodium metabisulfite and 20 ml of water were added. The solution temperature was raised to 80° C. and kept reacting for 45 minutes. Then, the temperature of the solution was dropped to 50° C. and the pH was adjusted to 3.5 by adding sulfuric acid. The solution was maintained under these conditions for 90 minutes, and then the pH raised to 8 and the temperature to 80° C. After cooling to room temperature the pH was adjusted to 8.5. The final solution was then adjusted to a final solid content of 10% by dilution with water.

EXAMPLE 2

Cylindrical specimens of 5 cm diameter were prepared for compressive strength tests. A ("control") specimen was prepared by mixing 20 g of water with 200 g of soil until it became a homogeneous wet sample. Then the wet soil was cast in a 5 cm cylindrical mold and compacted by the Instron compressive machine. The compaction load was 2000 kg. Then the specimen was taken out of the mold and left to dry in oven at 70° C. A stabilized specimen was prepared by mixing 20 ml of the soil stabilizer resin solution of 10% solid concentration (except if indicated otherwise) and the same procedure followed as set forth with respect to the control. Then dry specimens were tested for compressive strength determination. An Instron machine was used in crushing the soil specimen at a rate of 1 mm/min. And for surface run-off erosion tests, 6 kg of sandy soil was mixed with 0.6 kg water till it became a homogeneous wet sample. The wet sample was compacted in a 30×30×5 cm square pan. The compacted sample was then left in air to dry and water erosion was carried out on the dry sample. For soil stabilized samples, the resin solution was mixed with water and sprayed on the sample surface after it is dried, at a rate of 3.5 lit./m$^2$. The tray was then placed under running water at a rate of 6 lit./min. for 6 hours. At the end of the run, eroded soil was taken, dried and weighed to calculate its percentage from the original known weight of the soil. For some samples, the sample was left to dry, and the test repeated three times to evaluate stability against erosion.

EXAMPLE 3

A resin solution was prepared in accordance with Example 1. To 100 parts of this solution 0.1 part of polyvinyl alcohol (PVA) having an average molecular weight of 100,000 are added. The mixture was heated at 80° C. until the PVA completely dissolved. The effectiveness of this sample as a soil stabilizer was examined in accordance with example 2 and the results are shown in Table 1.

TABLE 1
Effects of Various Additives on Sandy Soil Erosion and Compressive Strength

| Sample* | Susceptibility to erosion % of weight loss | | Compressive strength (kg/cm$^2$) |
|---|---|---|---|
| | Single run | Triple run | |
| Control (no additive) | 60 | N.A. | 4.74 |
| Resin of Example 1 | 60 | N.A. | 13.38 |
| PVA (M. Wt. = 100000) (0.1% solution) | 0 | 0 | 3.24 |
| Resin of Example 3 | 0 | 0 | 10.34 |
| Resin of Example 4 | 0 | 3 | 10.61 |
| Resin of Example 12 | 0 | 0 | 14.50 |

*The concentration of solid in sample solution is 10%.

EXAMPLE 4

A resin solution was prepared in the same manner as in example 3, except that 0.05 part of PVA was used.

EXAMPLE 5

A resin solution was prepared in the same manner as in example 3, except that the average molecular weight of the PVA was 15000. The results of a soil stabilization test of this sample are listed in Table 2.

EXAMPLE 6

A resin solution was prepared in the same manner as in example 3, except that the average molecular weight of the PVA was 22000. The results of a soil stabilization test on this sample are listed in Table 2.

EXAMPLE 7

A resin solution was prepared in the same manner as in example 3, except that the average molecular weight of the PVA was 49,000. The results of a soil stabilization test on this sample are listed in Table 2.

EXAMPLE 8

A resin solution was prepared in the same manner as in example 3, except that the average molecular weight of the PVA was 72,000. The results of a soil stabilization test on this sample are listed in Table 2.

EXAMPLE 9

A resin solution was prepared in the same manner as in example 3, except that urea is added with melamine so that the weight of melamine, urea, paraformaldehyde and sodium metabisulfite are 50.00 g, 2.65 g, 53.14 g and 41.89 g, respectively. The resulting resin has a urea to melamine-urea molar ratio of 10%. The effect of this resin as a soil stabilizer was tested in accordance with example 2 and the results on compressive strength are shown in Table 3.

EXAMPLE 10

A resin solution was prepared in the same manner as in example 9, except that the urea is added with melamine so that the weights of melamine, urea, paraformaldehyde and sodium metabisulfite are 50.00 g, 15.9 g, 67.11 g and 62.83 g, respectively. The resulting resin has a urea to melamine-urea molar ratio of 40%. The compressive strength results showing the effect of the resinous solution as a soil stabilizer are shown in Table 3.

TABLE 2
Effect of PVA Average Molecular Weight on Soil Erosion and Compressive Strength.

| Sample | PVA Average Molecular weight | % PVA in solution | Susceptibility to erosion % of weight loss | Compressive strength (kg/cm$^2$) |
|---|---|---|---|---|
| Resin of example 5 | 15000 | 1 | 32 | 7.50 |
| Resin of example 6 | 22000 | 0.1 | 50 | 8.01 |
| Resin of example 7 | 49000 | 0.1 | 1.5 | 8.76 |
| Resin of example 8 | 72000 | 0.1 | 0 | 8.18 |
| Resin of example 3 | 100000 | 0.1 | 0 | 13.38 |

EXAMPLE 11

A resin solution was prepared in the same manner as in example 9, except urea is added with melamine so that the weights of melamine, urea, paraformaldehyde and sodium metabisulfite are 50.0 g, 24.1 g, 72.0 g, and 76 g, respectively, to give a resin having a urea to melamine-urea ratio of 50%. The compressive strength results showing the effect of the resin as a soil stabilizer are shown in Table 3.

EXAMPLE 12

A resin solution was prepared in the same manner as in example 9, except that the urea was added with melamine so that the weight of melamine, urea, paraformaldehyde and sodium metabisulfite are 50.0 g, 36.0 g, 84.2 g and 95.0 g, respectively. The resulting resin had a urea to melamineurea ratio of 60%. The effect of this resin as a soil stabilizer are shown in Tables 1 and 3.

EXAMPLE 13

200 ml of water are added to 172 g of urea at a temperature of 65° C. This reaction solution was stirred for 15 minutes, then the pH adjusted to 9, and 464 g of paraformaldehyde were added. The pH was readjusted to 9.0 and the reaction solution continuously heated until the temperature was raised to 100° C. The pH was then brought down to 4.8 with $H_2SO_4$ and the temperature maintained for 30 minutes. The pH of the solution was then raised to 7.0 and the temperature was brought to 45° C. within 20 minutes, then raised again to 90° C. To this solution, 199.4 g of urea were added and the pH adjusted to 5.0 using formic acid. The solution was then heated for 15 minutes, then cooled and its pH adjusted to 10.0. The solid content of the resulting solution was 70%. The above solution was split into batches and diluted to solid contents of 10%, 20% and 30%. To 100 parts of each of the diluted solutions, 0.1 part of polyvinyl alcohol (Average molecular weight=100000) were dissolved. The solutions were tested for their effectiveness as soil stabilizers in accordance with Example 2 and the results of compressive strength are shown in Table 3.

TABLE 3

Effects of Urea-Formaldehyde and Sulfonated Melamine-Urea Formaldehyde on Soil Stabilization

| Sample | Solution solid content, % | Urea × 100 / (urea + melamine) (molar ratio) (%) | Compressive strength (kg/cm²) |
|---|---|---|---|
| Resin of Example 1 | 10 | 0 | 13.38 |
| Resin of Example 3 | 10 | 0 | 10.34 |
| Resin of Example 9 | 10 | 10 | 14.06 |
| Resin of Example 10 | 10 | 40 | 13.78 |
| Resin of Example 11 | 10 | 50 | 13.30 |
| Resin of Example 12 | 10 | 60 | 14.50 |
| Resin of Example 13 | 10 | 100 | 5.41 |
| Resin of Example 13 | 20 | 100 | 2.43 |
| Resin of Example 13 | 30 | 100 | 3.00 |
| Resin of Example 14 | 10 | 60 | 8.01 |

EXAMPLE 14

To 50 g of a resin solution prepared in accordance with example 3, 50 g of the resin prepared in accordance with example 13 were added. The effectiveness of the resulting solution as a soil stabilizer in accordance with example 2 is shown in Table 3.

As illustrated by the examples, unstabilized sandy soil has low compressive strength and is subject to rapid erosion. And soil treated with sulfonated urea melamine formaldehyde has a higher compressive strength but is also subject to rapid erosion.

The examples also show that sandy soil treated with water soluble polyvinyl alcohol has improved water erosion characteristics but poor compressive strength. It has also been shown that treating sandy soil with urea formaldehyde improves the water erosion performance but has little or no effect on compressive strength with or without polyvinyl alcohol. The latter has been found to be true even with a high dose of urea formaldehyde condensate.

However, treating sandy soil with sulfonated urea melamine formaldehyde condensate and polyvinyl alcohol gives excellent water erosion performance and high compressive strength values.

While the method for treating soil, polymeric solutions and methods for preparing the solutions have been described by way of the foregoing examples and specific embodiments, these examples and embodiments are in no way taken as limiting and the process and composition of the present invention are to be construed as broadly as any and all equivalents of the following claims which properly define the scope of the invention.

What is claimed is:

1. A process for preparing a polymeric solution for use as a soil stabilizer comprising the steps of:
   (a) mixing an aqueous formaldehyde solution having a concentration ranging between about 30–50% at a temperature of between about 40° to 60° C. and a pH of about 10 to 12 with a urea-melamine resin so that the molar ratio of formaldehyde to urea-melamine is in the range of 2.5 to 4.5:1 until the urea-melamine resin dissolves;
   (b) adding a sulfonating agent in an amount to provide a molar ratio of sulfite group to the urea-melamine in the range of 0.8 to 1.2:1 and heating the resulting solution to a temperature of about 70° to 90° C. for a period of 20 to 100 minutes;
   (c) cooling the solution to about 40°–60° C. and adjusting the pH of the solution to about 2.5 to 4.0 and polymerizing the reactants in the solution for a period of 30 to 150 minutes;
   (d) adjusting the pH of the solution to about 7–9, heating the solution to a temperature of between 70°–90° C. and adding polyvinyl alcohol having an average molecular weight in the range of 40,000 to 120,000 to the solution until the weight ratio of the polyvinyl alcohol to sulfite groups is between 0.001 to 0.03, and maintaining the reaction solution at the 70° to 90° C. temperature for between 30 and 150 minutes.

2. The process of claim 1 wherein the solution containing polyvinyl alcohol is cooled and diluted with water until the final solids content is about 5 to 15%.

3. The process of claim 2 wherein the cooled solution is diluted with water until the final solids content is between 8–12%.

4. The process of claim 1 wherein the aqueous formaldehyde is prepared by dissolving paraformaldehyde in water, adjusting the pH to about 9, heating the mixture at about 40°–60° C. for about 30 minutes, and after the dissolution of the paraformaldehyde adding water until the concentration of formaldehyde is between 30 and 50% by weight, heating the solution to a temperature of 40° to 60° C. for about 15 minutes and raising the pH to between 10 and 12.

5. The process of claim 1 wherein the molar ratio of formaldehyde to urea-melamine resin in step (a) is adjusted to between 3 to 4:1.

6. The process of claim 1 wherein the molar ratio of the sulfite group to the urea-melamine resin in step (b) is adjusted to between 0.9 to 1.1:1.

7. The process of claim 1 wherein the weight of polyvinyl alcohol to sulfite groups is adjusted to between 0.005 to 0.015:1.

8. The process of claim 1 wherein an alkali metal sulfite is added to provide a molar ratio of sulfite group to urea-melamine in the range of 0.9 to 1.1:1 and the resulting solution heated to a temperature of 75°–85° C. for a period of 30 to 60 minutes and then cooled to 45°–55° C. the pH of this solution is then adjusted to 3.0–3.5 by adding sulfuric acid and allowed to polymerize for a period of 60 to 120 minutes, the pH of the resulting solution is then adjusted to 7–9 and the temperature raised to 75°–85° C., and polyvinyl alcohol having an average molecular weight in the range of 70,000 to 100,000 is added in an amount to provide the weight ratio of polyvinyl alcohol to sulfite groups in the range of 0.005 to 0.015:1 and the solution heated to maintain its temperature between 75° to 85° C. for a period of 60–120 minutes.

9. A water soluble polymeric composition for use as a soil stabilizer comprising a sulfonated urea-melamine formaldehyde resin having a relative average molecular weight of between about 700,000 and 1,000,000, a polyvinyl alcohol having an average molecular weight within the range of 40,000 to 120,000 wherein the weight ratio of the urea-melamine resin to the polyvinyl alcohol ranges from 100:1 to 200:1 and water with the concentration of solids within the solution within the range of 5% to 50%.

10. A water soluble polymeric composition according to claim 9 wherein the molar ratio of formaldehyde to urea-melamine is within the range of 2.5 to 4.5:1.

11. A water soluble polymeric composition according to claim 9 wherein the molar ratio of sulfite group to the urea-melamine is in the range of 0.8 to 1.2:1.

12. A water soluble polymeric composition according to claim 11 wherein the weight ratio of polyvinyl alcohol to sulfite groups is within the range of 0.001 to 0.03:1.

13. A water soluble polymeric composition obtained in accordance with the process set forth in claim 1.

14. A water soluble polymeric composition obtained in accordance with the process set forth in claim 3.

15. A water soluble polymeric composition obtained in accordance with the process set forth in claim 8.

16. A method for improving the mechanical properties of soil and its resistance to erosion comprising the steps of:
   (a) providing a water soluble polymeric composition containing a sulfonated urea-melamine formaldehyde resin having a relative average molecular weight of between about 700,000 and 1,000,000, a polyvinyl alcohol having an average molecular weight within tha range of 40,000 to 120,000 wherein the weight ratio of the urea-melamine resin to the polyvinyl alcohol ranges from 100:1 to 200:1, and water with the concentration of solids within the solution within the range of 5% to 50%; and,
   (b) spraying the water soluble solutions on to the surface of the soil which is to be stabilized.

17. A method for improving the mechanical properties of soil and its resistance to erosion according to claim 16 wherein the aqueous solution containing a sulfonated urea-melamine formaldehyde resin is sprayed onto the surface of the soil which is to be stabilized, and subsequently spraying the aqueous solution containing polyvinyl alcohol onto the same surface.

18. A method for improving the mechanical properties of soil and its resistance to erosion according to claim 16 wherein the ratio by weight of the sulfonated urea melamine resin to the polyvinyl alcohol ranges from about 100:1 to 200:1 and wherein the solids content of the solution is about 5 to 15%.

19. A method for improving the mechanical properties of soil and its resistance to erosion according to claim 18 wherein at least 1500 gallons of solution per acre of soil is sprayed onto the surface of the soil.

20. A method for improving the mechanical properties of soil and its resistance to erosion comprising the steps of:
   (a) mixing an aqueous formaldehyde solution having a concentration ranging between about 30–50% at a temperature of between about 40° to 60° C. and a pH of about 10 to 12 with a urea-melamine resin so that the molar ratio of formaldehyde to urea-melamine is in the range of 2.5 to 4.5:1 until the urea-melamine resin dissolves;
   (b) adding a sulfonating agent in an amount to provide a molar ratio of sulfite group to the urea-melamine in the range of 0.8 to 1.2:1 and heating the resulting solution to a temperature of about 70° to 90° C. for a period of 20 to 100 minutes;
   (c) cooling the solution to about 40°–60° C. and adjusting the pH of the solution to about 2.5 to 4.0 and polymerizing the reactants in the solution for a period of 30 to 150 minutes;
   (d) adjusting the pH of the solution to about 7-9, heating the solution to a temperature of between 70°–90° C. and adding polyvinyl alcohol having an average molecular weight in the range of 40,000 to 120,000 to the solution until the weight ratio of the polyvinyl alcohol to sulfite groups is between 0.001 to 0.03, and maintaining the reaction solution at the 70° to 90° C. temperature for between 30 and 150 minutes;
   (e) cooling the solution containing polyvinyl alcohol and diluting the solution with water until the final solids content is about 5–15%; and,
   (f) spraying the diluted solution onto the surface of the soil which is to be treated.

21. A method for improving the mechanical properties of soil and its resistance to erosion according to claim 20 wherein the solution set forth in step (e) is diluted to a final solids content of between 8–12%.

22. A method for improving the mechanical properties of soil and its resistance to erosion according to claim 20 wherein the aqueous formaldehyde is prepared by dissolving paraformaldehyde in water, adjusting the pH to about 9, heating the mixture to about 40°–60° C. for about 30 minutes, and after the dissolution of the paraformaldehyde, adding water until the concentration of formaldehyde is between 30 and 50% by weight, heating the solution to a temperature of 40° to 60° for about 15 minutes and raising the pH to between 10 and 12.

23. A method for improving the mechanical properties of soil and its resistance to erosion according to claim 20 wherein the molar ratio of formaldehyde to urea-melamine resin in step (a) is adjusted to between 3 to 4:1.

24. A method for improving the mechanical properties of soil and its resistance to erosion according to claim 20 wherein the molar ratio of the sulfite group to the urea-melamine resin in step (b) is adjusted to between 0.9 to 1.1:1.

25. A method for improving the mechanical properties of soil and its resistance to erosion according to claim 20 wherein the weight ratio of polyvinyl alcohol to sulfite groups is adjusted to between 0.005 to 0.015:1.

26. A method for improving the mechanical properties of soil and its resistance to erosion according to claim 20 wherein an alkali metal sulfite is added to provide a molar ratio of sulfite group to urea-melamine in the range of 0.9 to 1.1:1 and the resulting solution heated to a temperature of 75°–85° C. for a period of 30 to 60 minutes and then cooled to 45°–55° C.—the pH of this solution is then adjusted to 3.0-3.5 by adding sulfuric acid and allowed to polymerize for a period of 60 to 120 minutes, the pH of the resulting solution was then adjusted to 7-9 and the temperature raised to 75°–85° C., and polyvinyl alcohol having an average molecular weight in the range of 70,000 to 100,000 is added in an amount to provide the weight ratio of polyvinyl alcohol to sulfite groups in the range of 0.005 to 0.015:1 and the solution heated to maintain its temperature between 75° to 85° C. for a period of 60–120 minutes.

* * * * *